May 27, 1969 D. E. GRAHAM 3,446,993
CIRCUIT FOR PRODUCING FAST-RISE TIME PULSES
Filed Sept. 20, 1966
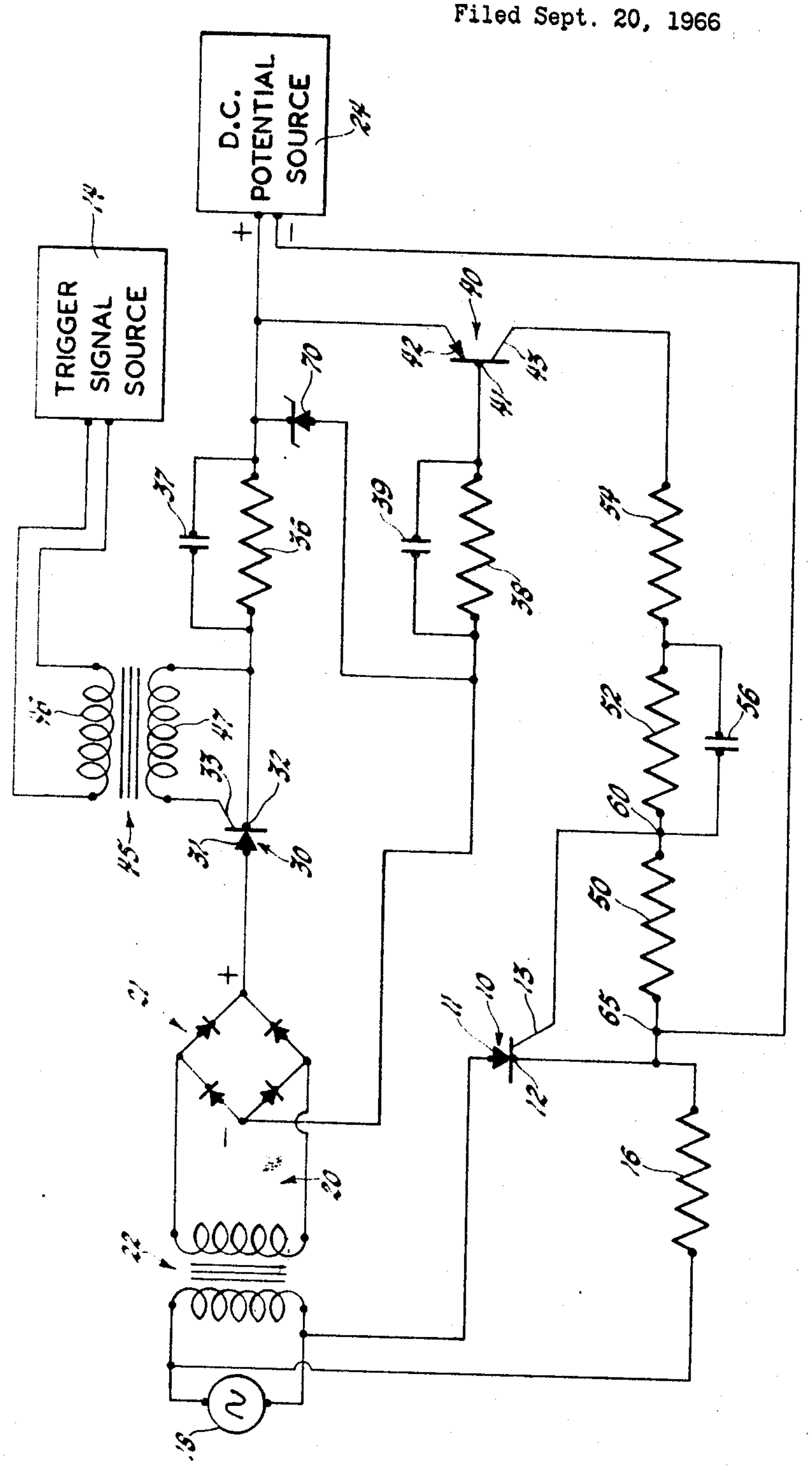
INVENTOR.
Donald E. Graham
BY
Richard G. Stahl
ATTORNEY 3,446,993
CIRCUIT FOR PRODUCING FAST-RISE TIME PULSES Donald E. Graham, Trotwood, Ohio, assignor to General Motors Corporation, Detroit, Mich., a corporation of Delaware Filed Sept. 20, 1966, Ser. No. 580,708
Int. Cl. H03k 5/12
U.S. Cl. 307—268 7 Claims

ABSTRACT OF THE DISCLOSURE

A circuit for producing fast rise power silicon controlled rectifier gating pulses. The emitter-collector electrodes of a type PNP transistor and three resistors are connected in series across a direct current potential source. The anode-cathode electrodes of a pilot silicon controlled rectifier and the emitter-base electrodes of the type PNP transistor are connected in series across a separate source of pulsating direct current potential. Upon the triggering of the pilot silicon controlled rectifier conductive by a trigger signal transformer coupled across the gate-cathode electrodes thereof to complete the emitter-base circuit for the type PNP transistor, this device conducts through the emitter-collector electrodes thereof and the potential drop appearing across one of the series resistors is applied as a gating pulse across the gate-cathode electrodes of the power silicon controlled rectifier.

The present invention relates to a circuit for producing a fast rise time pulse for triggering silicon controlled rectifiers into high *di/dt* loads.

The silicon controlled rectifier is a semiconductor device having a control electrode, generally termed the gate electrode, and two current carrying electrodes, generally termed the anode and cathode electrodes, which is designed to normally block current flow in either direction. With the anode and cathode electrodes forward poled, anode positive and cathode negative, the silicon controlled rectifier may be triggered to conduction upon the application, to the control electrode, of a control signal of a polarity which is positive in respect to the potential present upon the cathode electrode and of sufficient magnitude to produce control electrode-cathode, or gate, current.

Initially, current flow through the silicon controlled rectifier is concentrated within a small area which expands with time until current flows across substantially the entire conductive area of the device. Therefore, when a silicon controlled rectifier is switched into loads which permit an extremely rapid rise of load current, the silicon controlled rectifier may break down because of the excessive current flow through the initially small conductive area, thereby destroying the device. This is particularly true of power silicon controlled rectifiers employed to switch considerable inrush or initial current which are triggered to conduction by relatively weak control signal pulses.

One method of preventing the destruction of a power silicon controlled rectifier switching into high *di/dt* loads is to provide a control signal in the form of a pulse which rapidly rises to a level of sufficient magnitude to rapidly expand the area of conduction to a degree sufficient to safely carry the load current.

It is, therefore, an object of this invention to provide an improved circuit for producing a fast rise pulse for triggering silicon controlled rectifiers into high *di/dt* loads.

In accordance with this invention, at least a portion of the potential of a direct current potential source is applied as a control signal across the control electrode-cathode electrode of a silicon controlled rectifier through a controllable switching device having an extremely fast switching rate in response to trigger signals supplied by a trigger signal source.

For a better understanding of the present invention, together with additional objects, advantages and features thereof, reference is made to the following description and accompanying single figure drawing.

Referring to the drawing, the novel circuit of this invention for producing a fast rise pulse is set forth in schematic form in combination with a power silicon controlled rectifier 10 having an anode electrode 11, a cathode electrode 12 and a control or gate electrode 13 and a source of trigger signals 14 which, since it may be any one of several well known in the art, has been indicated in the figure in block form. The anode electrode 11 and cathode electrode 12 of power silicon controlled rectifier 10 are shown to be connected in series with an electrical load, indicated in the drawing as a resistor 16 but which may be any type high *di/dt* load, across a source of alternating current potential 18 which, since it may be any conventional alternating current potential source and forms no part of the invention, has been schematically illustrated in the figure.

Also shown in the figure is a first source of direct current potential, which may be a full wave rectified phase of the alternating current potential source 18 comprising a full wave bridge type rectifier circuit 21 transformer coupled through a coupling transformer 22 to source of alternating current potential 18, and a second source of direct current potential which, since it may be any one of several direct current potential sources well known in the art, has been indicated in the figure in block form and referenced by the numeral 24.

To produce an initiating signal in response to each trigger signal supplied by source of trigger signals 14, an electrical circuit is connected across source of direct current potential 20 and to apply at least a portion of the potential of source of direct current potential 24 as a control signal across the control electrode 13 and cathode electrode 12 of power silicon controlled rectifier 10, and electrical circuit is connected across source of direct current potential 24. Common to both of these electrical circuits and responsive to the initiating signals for completing the electrical circuit connected across source of direct current potential 24 is a controllable switching device having two current carrying electrodes and a control electrode of the type which may be triggered conductive upon the flow of current between the control electrode and one of the current carrying electrodes thereof.

The controllable switching device is indicated in the figure as a type PNP transistor 40 having the usual base 41, emitter 42 and collector 43 electrodes. It is to be specifically understood that alternate controllable switching devices possessing similar electrical characteristics may be employed as this controllable switching device without departing from the spirit of the invention.

The anode electrode 31 and cathode electrode 32 of a pilot silicon controlled rectifier 30 and the emitter electrode 42 and base electrode 41 of type PNP transistor 40 are connected in series across the positive and negative polarity direct current output terminals of bridge rectifier circuit 21 of source of direct current potential 20. To limit current flow through this circuit, series current limiting resistors 36 and 38 may be included. So that transistor 40 is rapidly switched upon the conduction of pilot silicon controlled rectifier 30, resistors 36 and 38 are shunted by respective capacitors 37 and 39 which, until charged, short out the respective resistors. As the anode electric 31 and cathode electrode 32 of pilot silicon controlled rectifier 30 are connected to the positive and negative polarity output terminals of bridge rectifier circuit 21, respectively, this device is forward poled.

The current carrying electrodes of transistor 40, emitter electrode 42 and collector electrode 43, are connected in series with at least one resistor 50 across the positive and negative polarity output terminals of direct current potenial source 24. So that at least a portion of the potential of direct current potential source 24 may be applied across the control electrode 13 and cathode electrode 12 of power silicon controlled rectifier 10, these electrodes are connected across resistor 50. With some applications, it may be necessary to limit current flow through this circuit, therefore, additional resistors 52 and 54 may be included. To provide for a rapid potential rise with resistors 52 and 54 in this circuit, resistor 52 may be shunted by a capacitor 56 which, until charged, shorts out resistor 52.

As the emitter electrode 42 and collector electrode 43 of transistor 40 are connected to the positive and negative polarity output terminals of direct current potential source 24, respectively, this type PNP transistor is forward poled.

To apply the trigger signals supplied by a source of trigger signals 14 across the cathode electrode 32 and control electrode of pilot silicon controlled rectifier 30, source of trigger signals 14 may be transformer coupled to pilot silicon controlled rectifier 30 through a coupling transformer 45 having a primary winding 46 and a secondary winding 47. The secondary winding 47 of transformer coupling transformer 45 is connected across the cathode electrode 32 and control electrode 33 of pilot silicon controlled rectifier 30, as shown.

Upon the appearance of a trigger signal from source of trigger signals 14, pilot silicon controlled rectifier 30 is triggered to conduction when the end of secondary winding 47 connected to control electrode 33 is of a positive polarity in respect to the opposite end. Conducting pilot silicon controlled rectifier 30 completes a circuit to provide emitter-bare current flow through type PNP transistor 40 from source of direct current potential 20, thereby triggering transistor 40 conductive.

As transistor 40 conducts, a circuit is completed through resistors 54, 52 and 50 across source of direct current potential 24. As transistor 40 has an extremely rapid switching rate, the current flow through this circuit rises rapidly and develops a potential across resistor 50 which is of a positive polarity at junction 60 in respect to junction 65. As the gate electrode 13 of power silicon controlled rectifier 10 is connected to junction 60 and the cathode electrode 12 of power silicon controlled rectifier 10 is connected to junction 65, this potential is of the proper polarity and of sufficient magnitude to produce gate current through power silicon controlled rectifier 10. Therefore, this device is triggered to conduction over the half cycles of alternating current potential supplied by alternating current potential source 18 during which the anode electrode 11 thereof is of a polarity positive in respect to the cathode electrode 12.

As the pulse supplied through the circuit including the emitter electrode 42 and collector electrode 43 of transistor 40 and resistors 54, 52 and 50 rises extremely fast to a high magnitude in view of the rapid switching rate of transistor 40, power silicon controlled rectifier 10 is rapidly triggered to full conduction capable of safely carrying the initial current demanded by load 16. After capacitor 56 has become charged, the current flow through this circuit is limited to a safe value by resistor 52 which prevents the destruction of power silicon controlled rectifier 10 by excessive gate-cathode current flow.

As the alternating current potential supplied by alternating current potential source 18 proceeds through zero to the negative half cycle, the potential across the positive and negative polarity terminals of bridge rectifier 21 reduces to zero, thereby extinguishing pilot silicon controlled rectifier 30 and the potential across the anode 11 and cathode 12 electrodes of power silicon controlled rectifier 10 is reversed, thereby extinguishing this device. At this time, the circuit is prepared for the next trigger signal supplied by source of trigger signals 14.

As pilot silicon controlled rectifier 30 may be triggered to conduction over any portion of the positive polarity excursions of the alternating current potential cycles, the direct current potential appearing across the positive and negative polarity terminals of bridge rectifier circuit 21 of source of direct current potential 20 may be of any value from substantially zero to the maximum alternating current potential of source 18. During the early or late portion of these half cycles when the direct current potential of source 20 is low, the circuit components have sufficient electrical rating to withstand these potentials. However, should pilot silicon controlled rectifier 30 be triggered conductive when these half cycles of alternating current potential are of maximum potential, the potential magnitude may exceed the rating of switching transistor 40. Therefore, Zener diode 70 may be connected in shunt with the emitter 42-base 41 electrodes of transistor 40. As the cathode and anode electrodes of Zener diode 70 are connected to the positive and negative polarity terminals of direct current potential source 20, respectively, this device is reverse poled. Therefore, Zener diode 70 is selected to have an inverse breakdown potential rating compatible with the emitter-base potential rating of the transistor selected as switching transistor 40 and, therefore will limit the potential thereacross to a safe value.

By deriving the initiating signals from a direct current potential source which is a rectified phase of the supply potential, the control signal is synchronized with source of alternating current potential 18 and, therefore, power silicon controlled rectifier 10 is switched only over those half cycles of the alternating current supply potential during which the anode 11-cathode 12 electrodes thereof are forward poled.

Although specific electrical devices and polarities have been set forth in the specification, it is to be specifically understood that alternate electrical devices having similar electrical characteristics and compatible electrical polarities may be substituted therefor without departing from the spirit of the invention.

While a preferred embodiment of the present invention has been shown and described, it will be obvious to those skilled in the art that various morifications and substitutions may be made without departing from the spirit of the invention which is to be limited only within the scope of the appended claims.

What is claimed is as follows:

1. A circuit for producing a fast rise pulse for triggering silicon controlled rectifiers into high *di/dt* loads comprising in combination with a power silicon controlled rectifier having anode, cathode and control electrodes and a source of trigger signals, a first source of pulsating direct current potential, and a second source of direct current potential, first electrical circuit means connected across said first source of direct current potential for producing an initiating signal in response to each trigger signal supplied by said source of trigger signals, second electrical circuit means connected across said second source of direct current potential for applying at least a portion of the potential of said second source of direct current potential as a control signal across said control electrode and said cathode electrode of said power silicon controlled rectifier and switch means responsive to said initiating signals included in said second electrical circuit means for completing said second electrical circuit means.

2. A circuit for producing a fast rise pulse triggering silicon controlled rectifiers into high *di/dt* loads as described in claim 1 wherein said means responsive to said initiating signals for completing said second electrical circuit means is a transistor.

3. A circuit for producing a fast rise pulse for triggering silicon controlled rectifiers into high *di/dt* loads as described in claim I wherein said first circuit means comprises, a pilot silicon controlled rectifier having anode, cathode and control electrodes, a controllable switching device having at least two current carrying electrodes and a control electrode of the type which may be triggered conductive upon the flow of current between said control electrode and one of said current carrying electrodes, means for connecting said anode-cathode electrodes of said pilot silicon controlled rectifier and said control electrode and one of said current carrying electrodes of said controllable switching device in series across said first source of direct current potential and means for applying the trigger signals supplied by said source of trigger signals across said cathode electrode and said control electrode of said pilot silicon controlled rectifier.

4. A circuit for producing a fast rise pulse for triggering silicon controlled rectifiers into high *di/dt* loads as described in claim 3 wherein said controllable switching device is a transistor.

5. A circuit for producing a fast rise pulse for triggering silicon controlled rectifiers into high *di/dt* loads as described in claim 1 wherein said second circuit means connected across said second source of direct current potential comprises, a controllable switching device having two current carrying electrodes and a control electrode of the type which may be triggered conductive upon the flow of current between said control electrode and one of said current carrying electrodes, means for connecting said current carrying electrodes of said contollable switching device and at least one resistor in series across said second source of direct current potential, means for connecting said cathode electrode and said control electrode of said power silicon controlled rectifier across said resistor and means for connecting said first circuit means across said control electrode and one of said current carrying electrodes of said controllable switching device.

6. A circuit for producing a fast rise pulse for triggering silicon controlled rectifiers into high *di/dt* loads as described in claim 5 wherein said controllable switching device is a transistor.

7. A circuit for producing a fast rise pulse for triggering silicon controlled rectifiers into high *di/dt* loads comprising in combination with a power silicon controlled rectifier having anode, cathode and control electrodes and a source of trigger signals, a first source of pulsating direct current potential and a second source of direct current potential, a pilot silicon controlled rectifier having anode, cathode and control electrodes, a transistor switching device having at least two current carrying electrodes and a base electrode, means for connecting said anode-cathode electrodes of said pilot silicon controlled rectifier and said base electrode and one of said current carrying electrodes of said transistor switching device in series across said first source of direct current potential, means for connecting said current carrying electodes of said transistor switching device and at least one resistor in series across said second source of direct current potential, means for connecting said cathode electrode and said control electrode of said power silicon controlled rectifier across said resistor and means for applying the trigger signals supplied by said source of trigger signals across said cathode electrode and said control electrode of said pilot silicon controlled rectifier.

References Cited

UNITED STATES PATENTS

| | | | |
|---|---|---|---|
| 3,183,372 | 5/1965 | Chin | 307—252 |
| 3,258,612 | 6/1966 | Rubelmann | 307—252 XR |
| 3,292,004 | 12/1966 | Heiberger | 307—252 |
| 3,304,438 | 2/1967 | Muskovac | 307—252 XR |

ARTHUR GAUSS, *Primary Examiner.*

JOHN ZAYZORSKY, *Assistant Examiner.*

U.S. Cl. X.R.

307—252, 253, 261, 263